(12) United States Patent
Cisar et al.

(10) Patent No.: US 6,533,827 B1
(45) Date of Patent: Mar. 18, 2003

(54) BONDING ELECTROCHEMICAL CELL COMPONENTS

(75) Inventors: Alan J. Cisar, Cypress, TX (US); Eric T. Clarke, Bryan, TX (US)

(73) Assignee: Lynntech Power Systems, Ltd., College Station, TX (US)

( * ) Notice: Subject to any disclaimer, the term of this patent is extended or adjusted under 35 U.S.C. 154(b) by 0 days.

(21) Appl. No.: 09/696,476

(22) Filed: Oct. 25, 2000

Related U.S. Application Data (63) Continuation of application No. 09/237,428, filed on Jan. 26, 1999.

(51) Int. Cl.[7] .......................... H01M 6/00; B05D 5/12
(52) U.S. Cl. ................. 29/623.4; 29/623.5; 427/115
(58) Field of Search .................. 29/623.5, 623.4, 29/623.1, 730, 731; 427/115

(56) References Cited

U.S. PATENT DOCUMENTS

| | | | |
|---|---|---|---|
| 3,650,005 A | 3/1972 | Kamiya et al. | |
| 3,846,903 A | 11/1974 | Rupert et al. | |
| 3,937,858 A | 2/1976 | Thick | |
| 4,015,950 A | 4/1977 | Galland | |
| 4,115,604 A | 9/1978 | Bernstein | |
| 4,135,656 A | 1/1979 | Stere | |
| 4,516,632 A | 5/1985 | Swift et al. | |
| 4,780,342 A | 10/1988 | Leblanc | |
| 4,882,202 A | 11/1989 | Holtzman | |
| 4,943,480 A | 7/1990 | Itzhak | |
| 5,058,665 A | 10/1991 | Harada | |
| 5,070,607 A | 12/1991 | Boardman et al. | |
| 5,217,751 A | 6/1993 | King | |
| 5,251,374 A | 10/1993 | Halstead et al. | |
| 5,252,410 A | 10/1993 | Wilkinson et al. | |
| 5,496,655 A | 3/1996 | Lessing | |
| 5,641,586 A | 6/1997 | Wilson | |
| 5,776,624 A | 7/1998 | Neatuber | |
| 5,798,187 A | 8/1998 | Wilson | |
| 5,858,569 A | 1/1999 | Meacher et al. | |
| 5,916,505 A | 6/1999 | Cisar et al. | |
| 5,981,098 A | 11/1999 | Vitale | |
| 6,020,083 A | 2/2000 | Breault et al. | |
| 6,022,634 A | 2/2000 | Ramunni et al. | |
| 6,054,228 A * | 4/2000 | Cisar et al. | 429/18 |
| 6,071,636 A | 6/2000 | Mosdale | |
| 6,171,721 B1 * | 1/2001 | Narayanan et al. | 429/41 |
| 6,220,497 B1 | 4/2001 | Benz et al. | |

FOREIGN PATENT DOCUMENTS

| | | |
|---|---|---|
| EP | 0 154 772 | 1/1985 |
| EP | 0 629 015 A1 | 4/1993 |
| EP | 44 26 692 C1 | 9/1995 |
| EP | 39 26 466 C2 | 12/1996 |
| EP | 0 784 352 A1 | 7/1997 |
| EP | 0 817 297 A2 | 7/1998 |
| EP | 197 08 472 A1 | 9/1998 |
| EP | 197 08 472 C2 | 2/1999 |

OTHER PUBLICATIONS

WO 88/06941 Mar. 17, 1988.
WO 98/37457 Feb. 17, 1998 No translation available.

* cited by examiner

*Primary Examiner*—Stephen Kalafut
*Assistant Examiner*—R Alejandro
(74) *Attorney, Agent, or Firm*—Streets & Steele; Jeffrey L. Streets (57) ABSTRACT

The invention provides a method for preparing subassemblies for an electrochemical cell or a stack of electrochemical cells, particularly a stack of fuel cells for the direct generation of electricity. The method includes bonding together two or more electrochemical cell components, such as plates, frames, flow fields, shims, gaskets, membranes and the like, to form subassemblies used to make an electrochemical cell stack. The bonding can be accomplished using either polymeric bonds (i.e., adhesives) where polymer and/or metal components are involved or metallurgical bonds (i.e., solder) where metal components are involved. The bonding provides tightly sealed cells and lower electronic contact resistances between components.

40 Claims, 3 Drawing Sheets

BONDING ELECTROCHEMICAL CELL COMPONENTS

This is a continuation of copending application (s) Ser. No. 09/237,428 filed on Jan. 26, 1999 still pending.

FIELD OF THE INVENTION

The present invention relates to electrochemical cells and methods for assembling electrochemical cells.

BACKGROUND OF THE INVENTION

Electrochemical cells utilizing a proton exchange membrane (PEM) can be configured in cells stacks having bipolar separator plates between adjacent cells. These bipolar separator plates are typically made from a variety of metals, such as titanium and stainless steel, and non-metallic conductors, such as graphitic carbon. Bipolar separator plates are typically fabricated by machining flow fields into a solid sheet of the material. Alternatively, when carbonaceous conductive materials are used, the precursor material is formed by injection molding and converted to the conductive carbon form by high temperature firing under carefully controlled conditions. The flow fields are made up of a series of channels or grooves that allow passage of gases and liquids.

Figure 1:
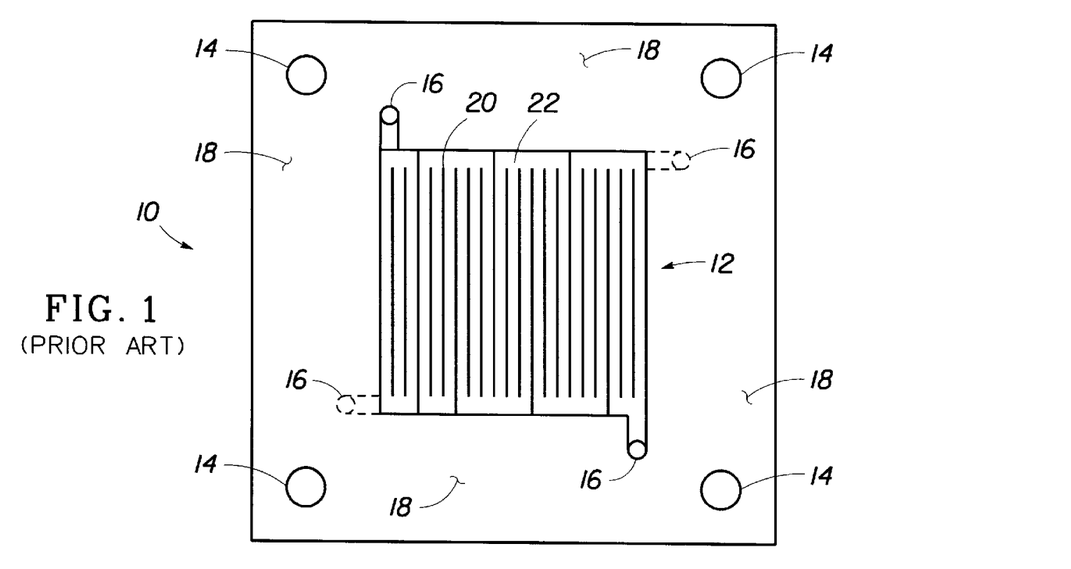
FIG. 1 is a face view of a typical metal separator plate with a serpentine flow field design.

FIG. 1 is a face view of a prior art bipolar separator plate 10 made from a solid sheet of a conducting material. The central portion of the plate has a flow field 12 machined into its surface. The flow field may direct fluid flow across the surface of an electrode in many patterns, but is illustrated here as parallel serpentine channels. Around the perimeter of the flow field 12, the plate provides a plurality of bolt holes 14 for assembling and securing a cell stack, various manifolds 16 for communicating fluids through the stack, and a flat surface 18 that allows the plate to be sealed against adjacent components of the cell stack.

In addition to providing a fluid flowfield, a bipolar separator plate for use in electrochemical cells must collect electrons liberated at one electrode (i.e., an anode), conduct the electrons through the plate, and deliver electrons to the face of another electrode (i.e., a cathode) on the opposing side of the plate. The bipolar plate shown in FIG. 1, collects and delivers electrons from electrodes of opposing cells through contact between the electrodes and the ridges 20 remaining between the channels 22 in the flowfield 12.

Figure 2:
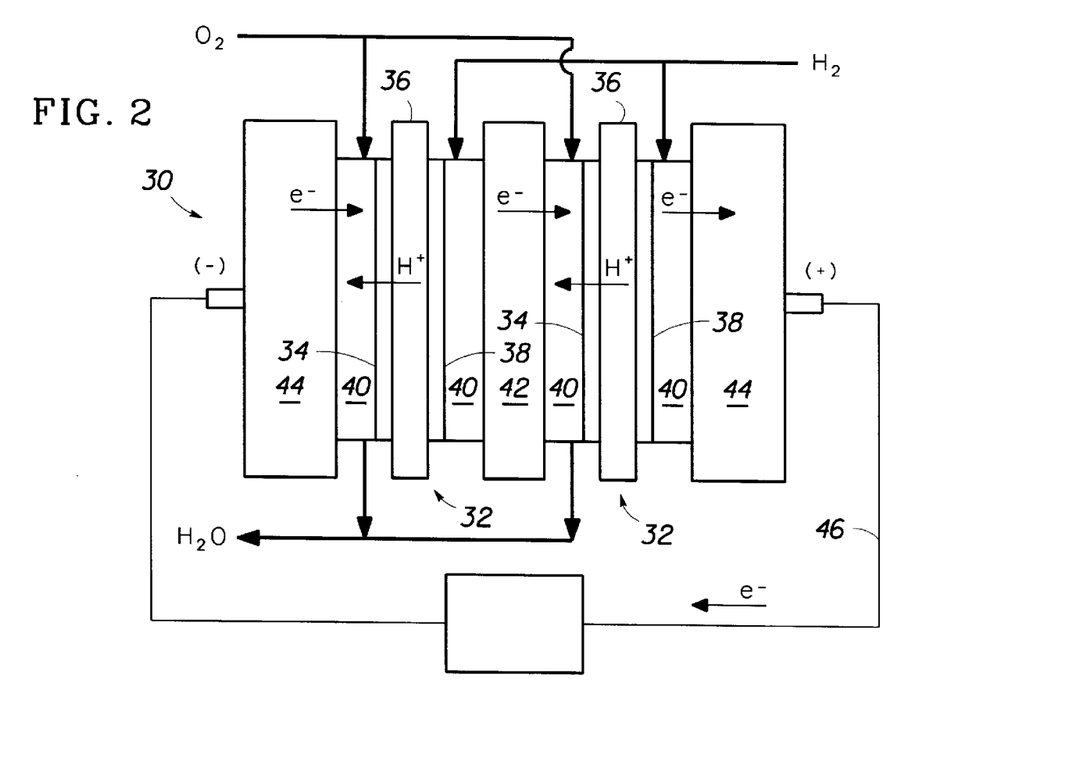
FIG. 2 is a schematic cross-section of a PEM fuel cell. The relative thickness of the components has been greatly exaggerated for clarity.

FIG. 2 is a schematic view of a proton exchange membrane (PEM) electrochemical cell configured as a hydrogen-air fuel cell stack 30. This stack 30 comprises two identical fuel cells 32 each having a cathode 34, a PEM 36 and an anode 38. Flow fields 40 (shown schematically for clarity) are provided on either side of the bipolar separator plate 42, as well as on the internal faces of the endplates 44. Electrons liberated at the anodes 38 induce electronic current flow to the cathode 34 of an adjacent cell on the other side of the plate 42 and, in the case of the last anode of the stack (here the anode on the right of the page), through an external circuit 46. Electrons are then combined with protons and oxygen at the cathodes 34 to form water. The electrical potential of the fuel cell 30 is increased by adding more cells 32 to the stack.

While the foregoing methods are relatively straight forward, they have several disadvantages. First, the solid piece of graphite or metal used to fabricate the bipolar separator plate constrains the density of the final product to a density approximately the same as that of the original stock, thereby producing a very dense and heavy bipolar separator plate. Second, machining each piece from a solid starting blank requires relatively expensive machining processes, as opposed to less expensive molding, casting or stamping processes. When carbon components are used the molding step is inexpensive, however, the controlled sintering required to convert the precursor to the final product is slow and requires precise atmosphere and temperature control throughout the process.

Another important aspect in fabricating an electrochemical fuel cell is the number of joints and junctions created in the cell. Reduction of the number of joints and junctions can greatly improve the performance of a electrochemical cell stack, for example if fabricated from a stack of flat components, because there are fewer potential leak points and fewer electronic contact resistances. A fabrication process that provides an electrochemical cell with a minimum of joints and junctions would be highly desirable.

Assembling a PEM fuel cell stack using relatively flat components requires gas tight seals at each interface. Gaskets are typically used to create gas tight seals, however gaskets increase the number of parts that must be fabricated and aligned when the stack is assembled. A method and apparatus for forming gas tight bonds or seals at the. interfaces between the components of an electrochemical cell would obviate the need for several gaskets and produce a more efficient cell.

Therefore, there remains a need for an improved bipolar separator plate. It would be desirable if the bipolar separator plate were thin, light weight, and could support high current densities. It would be further desirable if the bipolar separator plate reduced the number of joints or junctions in the individual cells or a cell stack and reduced the need for gaskets. Furthermore, it would be useful if the structure of the bipolar separator plate allowed the introduction of other specific properties, such as water permeability and reactant gas impermeability.

SUMMARY OF THE INVENTION

The present invention provides a method for preparing a subassembly for an electrochemical cell. The method includes aligning a subassembly having two or more electrochemical cell components with one or more bonding elements disposed between the two or more electrochemical cell components. The bonding elements have a melting point temperature that is lower than the melting point temperature of any one of the two or more electrochemical cell components. The subassembly is compressed and heated to a temperature that is between about the melting point temperature of the bonding element and about the lowest melting point temperature of the any one of the two or more electrochemical cell components. Preferably the temperature is less than 800° C., more preferably below 250° C. The subassembly is then allowed to cool.

The subassembly is preferably positioned into an electrochemical cell or an electrochemical cell stack. The two or more electrochemical cell components are preferably metal components selected from plates, shims, frames, flow fields or combinations thereof, such as stainless steel, titanium, nickel, nickel plated aluminum, nickel plated magnesium, or combinations thereof. The bonding element is preferably solder. The metal component is preferably dipped in a flux; then dipped in a bonding metal or solder, such as tin or a silver-tin alloy. The bonding metal, or solder can also be applied to the metal surface by electrodeposition or by various vacuum deposition techniques.

Light or easily oxidized metal components, such as those made from aluminum, magnesium, or alloys containing aluminum or magnesium are preferably coated with a layer of a corrosion resistant transition metal prior to the dipping the metal component in the flux. Suitable corrosion resistant transition metals include but are not limited to cobalt, copper, silver, nickel, gold or combinations thereof. Nickel is the most commonly used metal for the corrosion resistant layer.

Alternatively, the two or more electrochemical cell components can be polymer components selected from frames, gaskets, membranes, shims, or combinations thereof where the bonding element is preferably an adhesive. The two or more electrochemical cell components may also comprise one or more metal components and one or more polymer components, where the bonding element is an adhesive.

The two or more electrochemical cell components can include a plate and a flow field. The subassembly preferably includes a bipolar plate and a frame. The bipolar plate preferably has two plates, a flow field and a frame. The frame and flow field are disposed between the two plates with the frame disposed around the flow field. The frame has channels in fluid communication with the flow field.

In another embodiment of the invention, there is provided a fluid cooled bipolar plate assembly having two electronically conducting plates having opposing faces, an electronically conducting flow field bonded in electronic communication with a substantial portion of the opposing faces of the plates, between the two electronically conducting plates, and a frame disposed around a perimeter of the electronically conducting flow field and bonded between the two electronically conducting plates. The frame has channels for providing fluid communication between the flow field and a fluid source.

Preferably, an electronically conducting cathode flow field and an electronically conducting anode flow field are bonded to opposing sides of the assembly. The assembly is preferably bonded with an adhesive and/or solder.

In yet another embodiment there is provided a bipolar plate for electrochemical cells having two or more porous, electrically conducting sheets selected from expanded metal mesh, woven metal mesh, metal foam, conducting polymer foam, porous conductive carbon material or combinations thereof. An electrically conducting gas barrier is disposed in electrical contact between the sheets. A cell frame is disposed around a periphery of any one of the two or more porous electrically conducting sheets. The cell frame has at least one surface that is bonded to the gas barrier.

Preferably, the cell frame includes channels in fluid communication with the porous electrically conducting sheet. The cell frame can be metallic, where it is bonded to the gas barrier with a metallic bond. The metallic bond is preferably formed by soldering the cell frame to the gas barrier. Alternatively, the cell frame can be polymeric, where it is bonded to the gas barrier with a polymeric bond. Preferably the polymeric bond is produced by an adhesive.

BRIEF DESCRIPTION OF THE DRAWINGS

So that the above recited features and advantages the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention relates to components for use in electrochemical cells and methods for fabricating those components, including bipolar separator plates. More particularly, the present invention relates to a method for bonding adjacent components of an individual cell and/or adjacent cells of a stack. The bonding provides gas tight seals which reduces or eliminates the need for certain gasket components and reduces or eliminates certain electronic contact resistances.

One aspect of the invention provides a bipolar plate for an electrochemical cell having an electrically conducting flow field, at least one gas barrier and a cell frame. The components of the bipolar plate are bonded to each other to form gas tight bonds with either polymeric type bonds or metallic type bonds.

Another aspect of the present invention provides a method for bonding conductive portions of a bipolar plate. The conductive pieces are tinned or plated to coat them with a conductive metal and subsequently bonded together under pressure and heat to form bonds between the parts.

The component parts of a bipolar plate or other member of an electrochemical cell may be categorized as being either those that must be conductive for the stack to function or those that are not required to be conductive. The flow fields and the gas barriers of the bipolar plate must be fabricated from a conductive material, such as a metal or a conductive form of carbon, such as graphite. The cell frames and the sealing surfaces, also known as shims may be electronically insulating or conductive and can optionally be fabricated from various polymers, thereby resulting in a lower density component and significant overall weight savings for the cell or stack.

When individual components of a stack are fabricated from polymers and other components are fabricated from metals, there are three possible types of interfaces present in a fuel cell stack, namely polymer-to-metal interfaces, polymer-to-polymer interfaces (such as if the membrane and electrode assemblies (M&E's) are bonded in place) and metal-to-metal interfaces. Each of these types of interfaces are bonded differently to form an electrochemical cell stack.

Figure 3:
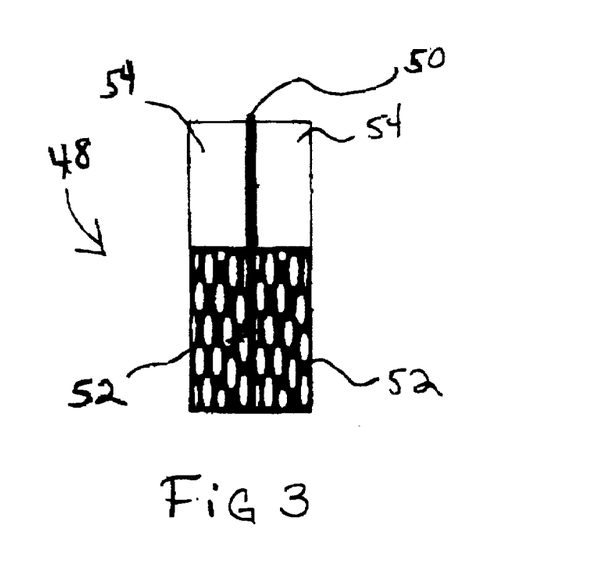
FIG. 3 is a partial cross-section of a bipolar plate having a metal gas barrier with metal flow fields and polymer cell frames.

FIG. 3 is a partial cross-section of a bipolar plate 48 having a metal gas barrier 50 with metal flow fields 52 and polymer cell frames 54, which essentially take the place of gaskets. The flow fields 52 are shown here as foamed metal, but may be fabricated from expanded metal, perforated metal, metal mesh screens or other porous conductive materials, as described in U.S. patent application Ser. No. 08/787,271, which is incorporated by reference in its entirety herein. The metal gas barrier 50 extends beyond the flow fields 52, preferably to the edge of the stack, with separate cell frames 54 on both the anode and cathode sides of the gas barrier 50. Flow fields 52 are placed against the barrier 50, and inside the frames 54 as shown. Additional gasketing may be included between the barrier and the frame if desired.

Figure 4:
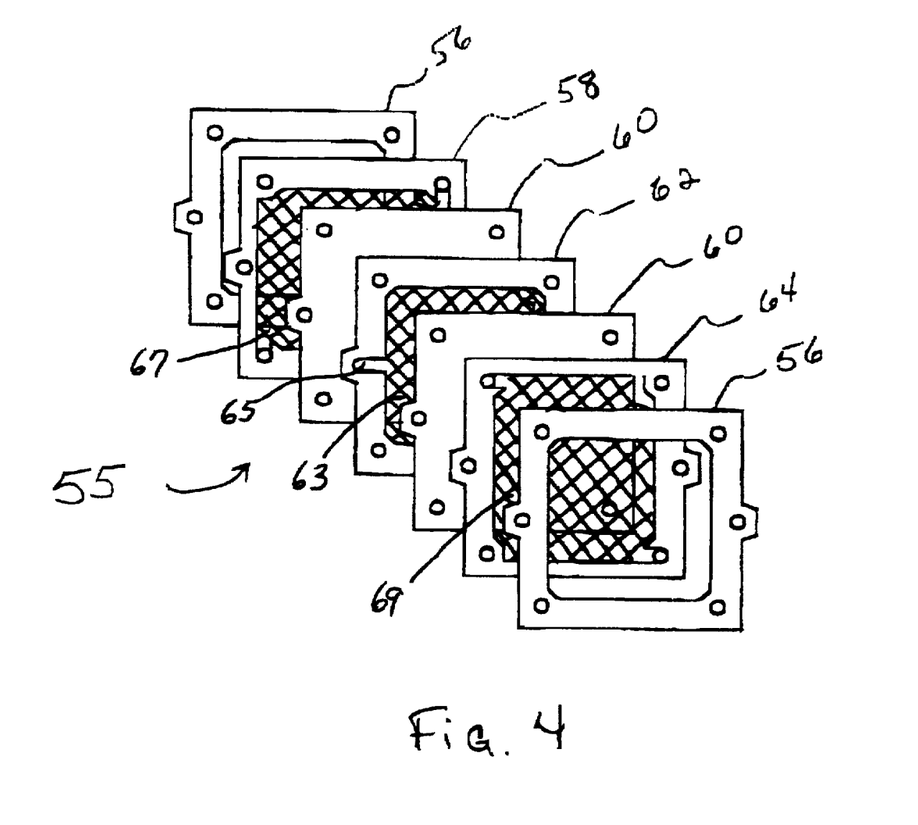
FIG. 4 is a schematic drawing of the flat components used in the three dimensional structure of a fluid cooled bipolar plate.

FIG. 4 is a schematic drawing of the components used in the three dimensional structure of a fluid cooled bipolar plate. A fluid cooled bipolar plate 55 is shown assembled from a series of substantially planar components including two cooling fluid barriers 60 and a cooling fluid frame 62, with an electronically conducting flow field 63 therein, similar to the flow field 52 of FIG. 3. Optionally, the fluid cooled bipolar plate 55 may further include an anode cell frame 58, cathode cell frame 64 and sealing plates 56 (for contacting and securing a PEM or membrane and electrode (M&E) assembly).

This bipolar plate includes an internal cooling flow field 63 that allows passage of a cooling fluid for cooling the stack. The cooling fluid flows from a cooling fluid inlet manifold 65, through the cooling flow field 63 within the cooling fluid frame 62, and into a cooling fluid outlet manifold (not shown) generally similar to, but opposed from, the inlet manifold 65. The flow field 67 in the anode cell frame 58, the flow field 63 in the cooling fluid frame 62 and the flow field 69 in the cathode cell frame 64 may be made from any porous conductive material as described above.

Bonding Polymers-to-Metals

Bonding the polymer elements of a lightweight PEM fuel cell stack, such as the anode and cathode cell frames, to metallic elements, such as the gas barriers may be done with an adhesive that bonds to both surfaces to form a gas-tight seal that remains stable under typical cell operating conditions.

Four types of polymers were tested for fabricating components for PEM fuel cells (polycarbonate, polyethersulfone, polyetherimide, and polyimide). These polymers are representative of thermoplastics considered to be useful for this application. The polymer sheets were bonded to gold-plated titanium sheets using different adhesives to determine the combinations that produced adequate bonding for use in electrochemical cells. Gold plated titanium was chosen for these experiments because it is considered to be one of the most challenging materials, useful in conductive electrochemical cells components, to bond with a polymer.

A variety of adhesives were used to bond 0.032" (0.813 mm) polymer sheets to gold plated 0.007" (0.178 mm) titanium sheets. The test specimens were approximately 2 centimeters wide and 2 centimeters long. The procedure involved preparing the surfaces, applying the adhesive, bonding, and curing the adhesive according to the individual manufacturers instructions. The bonded specimens were then exposed to water at 60° C. for 24 hours, after which they were examined to determine the quality of the bond. A representative group of adhesives showing reasonable bonding characteristics are included in Table I.

TABLE I

Adhesion Testing of Adhesively Bonded Polymer/Metal Couples.

| Polymer | Adhesive | Results |
| --- | --- | --- |
| Polycarbonate | Acrylic-epoxy hybrid | Fair adhesion to both surfaces and fair cohesion |
| Polycarbonate | Butadiene | Good adhesion to both surfaces; fair cohesion |
| Polycarbonate | Acrylic | Fair adhesion to both surfaces; poor cohesion |
| Polycarbonate | Polyurethane | Bond fails at Ti surface when wet |
| Polycarbonate | Neoprene | Good adhesion and cohesion properties but pigment leaches into water |
| Polycarbonate | Acrylic w/rubber | Bond fails at Ti surface when wet |
| Polycarbonate | Heat Seal | Excellent adhesion and cohesion properties when wet |
| Polyethersulfone | Butadiene | Good adhesion to both surfaces; fair cohesion |
| Polyethersulfone | Polyurethane | Bond fails at Ti surface when wet |
| Polyethersulfone | Neoprene | Excellent adhesion and cohesion properties but pigment leaches into water |
| Polyetherimide | Butadiene | Good adhesion to both surfaces but fair cohesion |
| Polyetherimide | Polyurethane | Bond fails at Ti surface when wet |
| Polyetherimide | Neoprene | Excellent adhesion and cohesion properties but pigment leaches into water |
| Polyetherimide | Acrylic w/rubber | Bond fails at gold plated Ti surface when wet |
| Polyetherimide | Heat Seal | Bond fails at good plated Ti surface when wet |
| Polyimide | Silicone | Bond fails at plastic surface |
| Polyimide | Pd/Ag Epoxy | Good adhesion and cohesion properties |
| Polyimide | Acrylic-epoxy hybrid | Bond fails at plastic surface |

TABLE II

Product and Manufacturer Identification for the Adhesives Appearing in Table I

| Adhesive | Product Name | Manufacturer |
| --- | --- | --- |
| Acrylic-epoxy hybrid | PLASTIC WELDER II | Devcon Inc., Danvers, MA |
| Butadiene | GOOP and E6000 | Eclectic Products, Carson, CA |
|  | STIK 'N SEAL | Loctite, Inc., Newington, CN |
| Acrylic | Acrylic 204 and Acrylic 406 | Lord Adhesives, Erie, PA |
| Polyurethane | PLIOGRIP 7775L | Ashland Chemical, Columbus, OH |
| Neoprene | SCOTCH GRIP 1357 | 3M, St Paul, MN |
| Acrylic w/rubber | Acrylic 330 | Loctite, Inc., Newington, CN |
| Heat Seal | Polyurethane 3218 | Bemis Assoc. Inc., Shirley, MA |
| Silicone | 748 Silicone Rubber Cement | Dow-Corning, Midland, MI |
| Pd/Ag Epoxy | Pd/Ag filled Epoxy | Epotek, Inc., Billerica, MA |

This list is considered to be representative and in no way exhaustive of the types of materials useful in carrying out the present invention.

Bonding Metals-to-Metals

Two types of metal-to-metal bonds are present in an electrochemical cell. There are bonds that are critical to the conductive path of electrons, such as the bonding of flow fields to gas barriers, and there are bonds that are critical to seal against fluid leakage, such as the bonding of gas barriers to metal frames. With regard to the gas tight bonds, it is beneficial, but typically not necessary, if the bond is also conductive.

Conductive bonds can be created between a variety of metals by soldering the parts together. Soldering is a well known technique where a relatively low melting metal is used to bond two components together that are fabricated from metals having higher melting points than the low melting metal or solder. It is imperative that the low melting metal wets the higher melting metals to achieve a good bond.

Conventional soldering for wire attachment for an electrical assembly involves heating the parts to above the melting point of the solder, then applying a flux to remove the oxide film on the metal and finally applying the solder, with the flux and the solder sometimes applied together. Soldering large areas requires a different process. In order to solder large flat areas, the part is first coated with the bond-forming metal or alloy by one of several methods. It can first be coated with flux and then coated with solder in a process known as tinning. The flux can be applied in a variety of ways, however brushing and dipping are the most commonly used methods. Application of solder is typically accomplished by dipping the part in a container of molten solder. Specific approaches to tinning parts fabricated from stainless steel, nickel, titanium, magnesium, aluminum, and alloys containing aluminum and magnesium are described below. The bond forming metal or alloy can also be plated onto the metal surface by either electrodeposition or electroless deposition, both of which are well known processes. Also, the bond forming metal or alloy can be deposited onto the metal surface using vacuum deposition techniques, such as evaporation, chemical vapor desposition and sputtering.

After depositing the bond forming metal by tinning or plating, the parts are bonded by clamping the flat surfaces to be bonded together and reheating the assembly to above the softening point of the solder. Both the clamping and the heating can be accomplished simultaneously through the use of a hot press,.

The procedure for tinning stainless steel parts includes, dipping the part in an acid flux solution; slowly dipping the part in molten solder; dipping the part in the acid flux a second time; and dipping the part in molten solder a second time. Preferably, the tinning procedure is carried out in an inert atmosphere. The clean stainless steel part is immersed in a water soluble flux, preferably an acid flux, and the excess solution is allowed to drain off. The part is then slowly lowered into the molten solder. It is important that the part be immersed slowly, because the flux is only active for removing the oxide film while the flux is hot, and a slow immersion process leads to a longer exposure time and better oxide removal. A silver solder, such as eutectic tin-silver (96.5 Sn: 3.5 Ag) is preferred. In some cases, a single immersion in the molten solder is sufficient, but in other cases a second dipping is preferred. In the latter case, after the part is removed from the solder, it is allowed to cool slightly to insure that the solder has solidified, and immersed in the flux a second time. The part is then removed from the flux and the excess solution allowed to drain off. Ideally, the part should be sufficiently hot to boil the flux as it makes contact. In the last step, the part is slowly lowered into the molten solder and removed.

The first immersion in the solder covers most of the surface of the stainless steel part with a thin layer of solder, however occasionally there are areas where the flux did not remove all of the oxide film, that are poorly coated. The second dip in the flux with the part hot removes any remaining oxide film from the part and produces a shiny, mirror-like finish on the metal. It is important that all grease and superficial dirt be removed from the surface of the metal before soldering. Failure to clean and degrease the surface may leave a protective film on the oxide layer that prevents the flux from cleaning the surface, and prevents the solder from sticking. After tinning, the parts are preferably thoroughly washed in deionized water to remove all remaining traces of the flux. Because water soluble flux residues float on the surface of the molten solder, most parts will have traces of flux present on the tinned surface. Other types of flux may be used to carry out the tinning process.

The same tinning procedure works for titanium, aluminum, magnesium, and alloys containing these elements as well, if they are first plated with nickel, copper, or another metal that more readily accepts tinning. Precious or base metals may be used to plate the titanium.

The procedure for tinning titanium, aluminum, and magnesium containing parts includes plating the part with nickel, dipping the part in an acid flux solution, and dipping the part in molten solder. In order to nickel plate the part, the oxide film must be removed.

After the part has been nickel plated, it is coated with flux and dipped in molten solder to produce a shiny tinned finish using the same cycle and silver solder as is used with stainless steel. Generally, only a single immersion is required for each the flux and the solder with nickel-plated aluminum.

Both aluminum and titanium can be tinned directly if the proper combination of flux and solder are employed. With the use of a high viscosity liquid flux, aluminum and titanium can be directly tinned. In this process the part is first immersed in the flux, and then slowly immersed in molten solder, with a single cycle being sufficient. For these metals, a solder with a more active component is preferred, such as eutectic tin-zinc (91% Sn, 9% Zn, melting point 199° C.).

It is important to note that for best results, all of the tinning operations described herein are preferably carried out in an oxygen free atmosphere, or an atmosphere with a substantially reduced oxygen content. It is not necessary, and indeed in most cases it is not possible, to exclude water, since water is a major component of many fluxes.

As long as a tin based solder is being used, it doesn't matter what alloying elements are present in the solder when forming the final bonds, the tinned parts can readily be bonded together. When solders with dissimilar compositions are used to tin metals to be bonded it is important to heat the clamped components to at least the melting point of the higher melting solder.

While the metallurgical bond produced by soldering metal components together is preferred, it is not the only approach to joining metal components. Adhesives, like those listed in Table II, can be used for some metal-to-metal bonds as well. In general, these adhesives are suitable for bonds where through-bond electrical conductivity is not required. Except for the Pd—Ag filled epoxy, none of the adhesives listed in Table II are conducting. The conductive adhesive bond may be substituted for a soldered joint in producing an electrochemical cell or stack in accordance with the present invention.

Still other metal joining processes applicable to this type of stack fabrication will be apparent to those skilled in the art of metal joining. These are also considered to be part of this invention when they are employed for the assembly of an electrochemical cell stack in a manner essentially similar to that described here.

Bonding Polymers to Polymers

There are many adhesives available which are suitable for bonding engineering thermoplastics to each other. However, bonding PEM membranes to other materials is more difficult because perfluorinated membranes are resistant to adhesion by most adhesives. Dow-Corning 748™ adhesive (see line 8 in Table II) adheres well to the membrane and to many metal surfaces. While the peel strength, at about 1.3 kg per centimeter of bond, is inadequate for most structural purposes, it is more than adequate to produce a thin, fully adherent seal for use in an electrochemical cell.

Assembly Procedures

Assembling a fully bonded electrochemical cell stack includes several steps. First, all of the metal parts are coated with the bonding metal, including the anode flow field, cathode flow field, and cooling flow field; the gas barriers; and the frame around the cooling flow field. These parts are then stacked into position, carefully positioned, and held in place using an alignment device or jig. The parts and the jig are then placed in a hot press to clamp the parts together, pressing the gas barriers firmly against the cooling frame and the flow fields firmly against the gas barriers. The press is heated to slightly above the melting point of the highest melting bonding metal present in order to remelt the bonding metal. The bonded assembly is then allowed to cool in the press.

Sheets of hot melt adhesive are cut to match the size and shape of the anode and cathode cell frames. These are used to bond the cell frames to the cell shims through the use of the hot press. Those two piece subassemblies are bonded to the assembled bipolar plate by the same technique. All of the hot melt bonds can be made in a single step, if desired.

An uncooled bipolar plate is somewhat easier to fabricate because it contains few parts. The flow fields are bonded to opposite sides of a gas barrier by soldering. The anode and cathode cell frames are attached to the gas barriers and the shims with hot melt adhesives in one or two pressing operations.

The following examples show some of the preferred embodiments of the present invention, however they are not to be considered limiting in any sense.

EXAMPLE 1

This example shows the fabrication of the core of a liquid cooled bipolar plate.

Two titanium gas barriers were fabricated from 0.0045" (0.114 mm) metal sheet and plated with gold. A frame was fabricated from 0.032" (0.813 mm) polyether-sulfone sheet. A flow field was fabricated from three layers of expanded titanium, one with a thickness of about 0.030" (0.762 mm) at full expansion and two which were expanded and subsequently flattened back to their original 0.003" (0.076 mm) thickness. All three sheets were spot welded together, with the 0.003" sheets welded to opposing faces of the 0.030" sheet, and the welded assembly was gold plated. This flow field was deliberately produced thicker than the frame to insure that the flow field, which compresses like a spring, would put pressure on the gas barriers to ensure electrical contact with the barriers.

The faces of the polyethersulfone frame were coated with ECLECTIC E6000 adhesive. The frame was then pressed, by hand, against one gas barrier, with both parts kept in alignment by the use of a positioning jig fabricated for this purpose and equipped with alignment pins to insure that all of the parts stay precisely in alignment. The flow field was placed in the cavity produced by the frame on the barrier, and the second gas barrier was pressed on top of the other parts. The assembly, still in the assembly jig, was placed in a hot press. The components were then pressed together and cured under sufficient compression to keep the parts from moving at 60° C. for 24 hours. The result was a bipolar plate having a gas barrier with fluid access to the internal flow field suitable for passage of a cooling fluid for the purpose of removing waste heat from the fuel cell stack. In subsequent assembly steps, this subassembly was treated in the same manner as a simple gas barrier sheet.

EXAMPLE 2

This example shows the bonding of two components with hot melt adhesive.

A face shim or sealing plate 56 was fabricated from 0.0045" (0.114 mm) titanium sheet, as illustrated in FIG. 4. An anode cell frame was fabricated from 0.032" (0.813 mm) polyethersulfone sheet. The anode cell frame was used as a template to cut a sheet of hot melt adhesive (BEMIS number 3218). All three pieces were stacked in a positioning jig fabricated for this purpose and equipped with alignment pins to insure that all of the parts stay precisely in alignment with the adhesive between the metal shim and the polymer frame. The jig, with the parts inside of it, was placed in a hot press, compressed to insure and maintain intimate contact between the sheet components, and heated to 150° C. (The temperature used for this step is a function of the adhesive used.) After several minutes, the press was cooled, and the subassembly removed.

This subassembly is suitable for use as the frame around the anode flow field and the contact surface against the membrane portion of a membrane and electrode assembly (M&E) and used in assembling a fuel stack.

EXAMPLE 3

This example shows the tinning of stainless steel. A gas barrier was fabricated from 0.010" (0.254 mm) stainless steel sheet. The gas barrier and the other items required to carry out the tinning operation (flux, solder, heater, tongs, temperature indicator, etc.) are placed in a glove box and the atmosphere of the box thoroughly purged with argon to prevent oxidation of freshly cleaned surfaces. The barrier is immersed in an acid type liquid flux such as LA-CO N-3 (LA-CO Industries, Chicago, Ill.). Excess liquid is allowed to drain-off stainless steel sheet, and the piece is slowly immersed in molten silver-tin eutectic solder (3.5% Ag, 96.5% Sn, melting point 221° C., (Kester Solder, Des Plaines, Ill.). It is important to immerse the piece slowly, since the flux is only active and capable of dissolving the surface oxide layer on the metal over a limited temperature range, and a slow immersion insures an adequate exposure of the entire surface of the part to the flux at its active temperature, but before all of the salts active for dissolving the oxide film vaporize.

After immersion, the part is removed from the molten solder, with all parts of the surface which were stripped of oxide by the action of the flux being coated with solder. The part is allowed to cool until the solder solidifies before being re-immersed in the flux. It is preferable to have the part remain sufficiently hot to boil the liquid slightly as it contacts the surface of the metal. The part is removed from the flux and slowly re-immersed in the solder, with the second cycle serving to remove the oxide film from the parts of the surface which were not stripped the first time and coat those areas with solder. After the part is removed from the molten solder it is allowed to cool in the air until the solder solidifies. The part may then be laid down on a heat resistant surface or other support to finish cooling. The result is a mirror-like finish on the tinned part.

EXAMPLE 4

This example shows the tinning of aluminum. A cooling cell frame for a fluid cooled bipolar separator plate was fabricated from 0.020" (0.508 mm) aluminum sheet and plated with nickel. The gas barrier and the other items required to carry out the tinning operation (flux, solder, heater, tongs, temperature indicator, etc.) were placed in a glove box and the atmosphere of the box was thoroughly purged with argon to prevent oxidation of freshly cleaned surfaces. The barrier was immersed in an acid type liquid flux such as LA-CO N-3 (LA-CO Industries, Chicago, Ill.). Excess liquid was allowed to drain-off, and the piece was slowly immersed in molten silver-tin eutectic solder (3.5% Ag, 96.5% Sn) having a melting point of 221° C. (Kester Solder, Des Plaines, Ill.). It is important to immerse the piece slowly, since the flux is only active and capable of dissolving the surface oxide layer on the metal over a limited temperature range, and immersing the part slowly ensures that the entire surface of the part is adequately exposed to the flux at its active temperature, but before the volatile components are vaporized. After immersion, the part is removed from the molten solder with the surface completely coated with solder.

EXAMPLE 5

This example shows the bonding of aluminum and stainless steel components to form the core of a liquid cooled bipolar plate using solder.

Two gas barriers and a flow field are tinned as described in Example 3. An aluminum cooling frame is tinned as described in Example 4. The components are stacked as shown in FIG. 4 and placed in a hot press with a thermocouple in contact with the side of the frame and clamped firmly together. The press is heated until the thermocouple indicates that the load has reached and maintained a temperature of about 230° C. for about five minutes, at which time the power to the heaters is turned off and the entire assembly is allowed to cool while maintaining the assembly in a compressed state. The result is a water cooled gas barrier with fluid access to the internal flow field suitable for use as a component in a fuel cell stack with the specific purpose of removing waste heat from the stack. This subassembly was treated in the same manner as one of the simple gas barrier sheets in subsequent assembly steps.

EXAMPLE 6

This example illustrates the performance of a fuel cell stack produced in accordance with the present invention.

Figure 5:
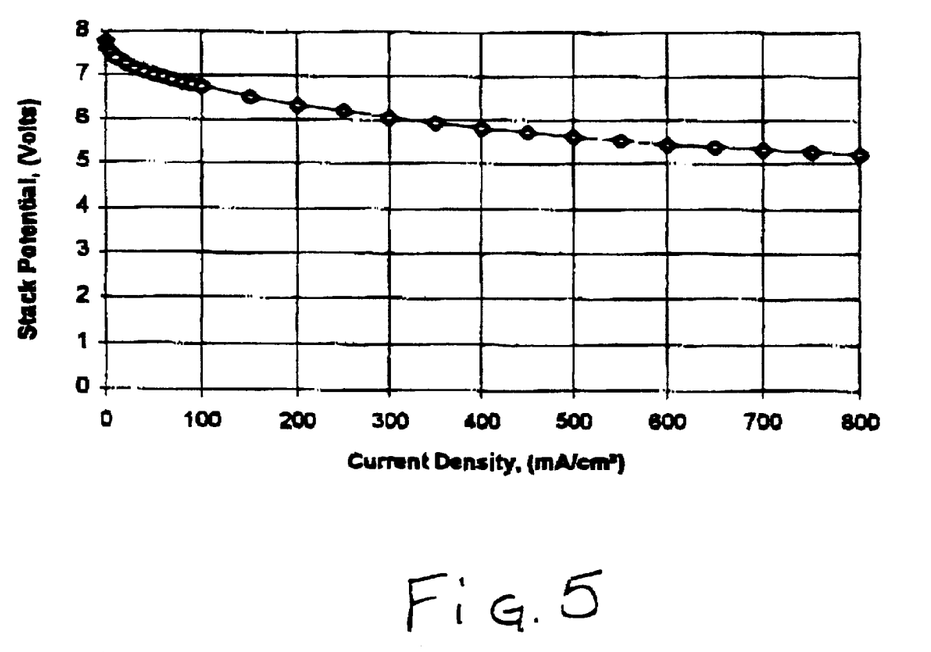
FIG. 5 is a graph showing the performance of a fuel cell stack of the present invention.

The method of Example 1 was used to prepare a set of four water cooled bipolar plate cores sized for use in a fuel cell stack with an active.area for 125 cm². Three uncooled bipolar plates were also used in the stack. The method of Example 2 was used to prepare eight anode cell frames with shims and eight cathode cell frames with shims for a stack of that size. Additional components (M&E's, flow fields, gaskets, etc.,) were also prepared by conventional means. These were used to fabricate an eight cell PEM fuel cell stack. The stack was operated using hydrogen fuel with air as the oxidant. FIG. 5 illustrates the performance of that eight-cell stack, 125 cm² per cell active area while operating at an M&E temperature of 62–64° C., a fuel gas pressure of 15 psig, both fuel and oxidant gases humidified to a dew point of 27° C., and air supplied at four-fold stoichiometry.

The stack provided an output of 967 W/kg and 846 W/L for the repeating units of this stack which was determined to be an efficiency of 53.4% (at a potential of 0.651 V/cell).

While the foregoing is directed to preferred embodiments of the present invention, other and further embodiments of the invention may be devised without departing.from the basic scope thereof, and the scope thereof is determined by the claims which follow.

What is claimed is:

1. A method for preparing a subassembly for an electrochemical cell, comprising:
   aligning a subassembly having two or more electrochemical cell components with one or more bonding elements disposed between the two or more electrochemical cell components, wherein the bonding elements have a melting point temperature that is lower than the melting point temperature of any one of the two or more electrochemical cell components;
   compressing the subassembly;
   heating the subassembly under compression to a temperature less than 800° C.; and
   allowing the subassembly to cool under compression to form bonds between the two or more electrochemical cell components.

2. The method of claim 1, further comprising:
   positioning the subassembly into an electrochemical cell.

3. The method of claim 1, further comprising:
   positioning the subassembly into an electrochemical cell stack.

4. The method of claim 1, wherein the two or more electrochemical cell components are metal components selected from plates, shims, frames, flow fields or combinations thereof and the bonding element is a metal or metal alloy that melts at a temperature below 500° C.

5. The method of claim 4, wherein the metal components are selected from stainless steel, nickel, aluminum, titanium, magnesium or combinations thereof.

6. The method of claim 4, further comprising:
   dipping the metal components in a flux; then
   dipping the metal components in a bonding metal.

7. The method of claim 6, wherein the bonding metal comprises a metal selected from tin bismuth, lead, indium, and alloys thereof.

8. The method of claim 6, wherein the bonding metal comprises silver and tin.

9. The method of claim 6, further comprising:
   coating the metal components with a layer of a corrosion resistant transition metal prior to the dipping of the metal components in the flux.

10. The method of claim 4, wherein the bonding metal is applied to at least one of the metal components surfaces by reductive deposition from a solvent.

11. The method of claim 4, wherein the bonding metal is applied to at least one of the metal components surfaces by vacuum evaporation or sputtering.

12. The method of claim 10, wherein the solvent is selected from water or a water based fluid.

13. The method of claim 10, wherein the deposited metal comprises a component selected from tin, bismuth, lead, indium or an alloy thereof.

14. The method of claim 1, wherein the two or more electrochemical cell components are polymer components selected from frames, gaskets, proton exchange membranes, shims, or combinations thereof and the bonding element is an adhesive.

15. The method of claim 1, wherein the two or more electrochemical cell components comprise one or more metal components and one or more polymer components, and wherein the bonding element is an adhesive.

16. The method of claim 1, wherein the two or more electrochemical cell components include a plate and a flow field.

17. The method of claim 1, wherein the subassembly includes a bipolar plate.

18. The method of claim 17, wherein the subassembly further includes a frame.

19. The method of claim 17, wherein the bipolar plate comprises two plates, a flow field and a frame, wherein the frame and flow field are disposed between the two plates with the frame disposed around the flow field, and wherein the frame has channels in fluid communication between the flow field.

20. The method of claim 6, wherein the bonding material is a solder.

21. The method of claim 7, wherein the bonding material is a solder.

22. The method of claim 8, wherein the bonding material is a solder.

23. The method of claim 3, wherein the electrochemical cell stack is a fuel cell stack.

24. The method of claim 23, wherein the fuel cell stack has proton exchange membranes.

25. The method of claim 17, wherein the bipolar plate comprises a metal.

26. The method of claim 25, wherein the metal is selected from stainless steel, nickel, aluminum, titanium, magnesium and combinations thereof.

27. The method of claim 17, wherein the bipolar plate comprises graphitic carbon.

28. The method of claim 27, wherein the graphitic carbon bipolar plate is injection molded.

29. The method of claim 28, wherein the injection molded graphitic carbon bipolar plate comprises flow fields make up of a series of channels and ridges.

30. The method of claim 29, wherein the channels allow fluids to pass across the surface of an electrode.

31. The method of claim 29, wherein the channels and ridges form parallel serpentine channels.

32. The method of claim 25, wherein the bipolar plate is made by methods selected from casting and stamping.

33. The method of claim 1, wherein the electrochemical cell components are substantially flat components.

34. The method of claim 1, wherein the electrochemical cell forms gas tight bonds or seals at the interfaces between the components of the electrochemical cell.

35. The method of claim 25, wherein the bipolar plate is water permeable and reactant gas impermeable.

36. The method of claim 17, wherein the bipolar plate is thin, light weight, and supports high current densities of about 0.8 Amps per square centimeter.

37. The method of claim 1, wherein the subassembly is heated to a temperature less than 500° C.

38. The method of claim 1, wherein the subassembly is heated to a temperature less than 250° C.

39. The method of claim 1, wherein the subassembly is heated to a temperature less than 150° C.

40. The method of claim 9, wherein the corrosion resistant transition metal comprises cobalt, copper, silver nickel, gold and combinations thereof.

* * * * *